US012803220B2

(12) United States Patent
Takashima et al.

(10) Patent No.: US 12,803,220 B2
(45) Date of Patent: Nov. 17, 2026

(54) CONNECTOR WITH A LEVER

(71) Applicant: Yazaki Corporation, Tokyo (JP)

(72) Inventors: Naoto Takashima, Shizuoka (JP); Hiroshi Miyazaki, Tokyo (JP)

(73) Assignee: Yazaki Corporation, Tokyo (JP)

( * ) Notice: Subject to any disclaimer, the term of this patent is extended or adjusted under 35 U.S.C. 154(b) by 377 days.

(21) Appl. No.: 18/654,295

(22) Filed: May 3, 2024

(65) Prior Publication Data

US 2024/0405479 A1 Dec. 5, 2024

(30) Foreign Application Priority Data

Jun. 1, 2023 (JP) ................................ 2023-090976

(51) Int. Cl.
*H01R 13/629* (2006.01)

(52) U.S. Cl.
CPC .............................. *H01R 13/62938* (2013.01)

(58) Field of Classification Search
CPC ............ H01R 13/629; H01R 13/62938; H01R 13/62955; H01R 13/40; H01R 13/502; H01R 24/00
USPC .......................................................... 439/345
See application file for complete search history.

(56) References Cited

U.S. PATENT DOCUMENTS 5,230,635 A * 7/1993 Takenouchi ..... H01R 13/62938 439/153
5,474,462 A * 12/1995 Yamanashi ...... H01R 13/62933 439/153
5,509,816 A * 4/1996 Katsuma .......... H01R 13/62938 439/153
5,551,885 A * 9/1996 Yamanashi ...... H01R 13/62933 439/372
5,611,703 A * 3/1997 Okamoto ......... H01R 13/62933 439/153
6,217,354 B1 * 4/2001 Fencl ............... H01R 13/62977 439/372
6,413,105 B2 * 7/2002 Noro ................ H01R 13/62938 439/157
6,666,697 B2 * 12/2003 Yamashita ....... H01R 13/62977 439/157
6,679,711 B2 * 1/2004 Takahashi ........ H01R 13/62938 439/153

(Continued)

FOREIGN PATENT DOCUMENTS

JP 58-002519 U 1/1983
JP 2016-100185 A 5/2016

*Primary Examiner* — Harshad C Patel
(74) *Attorney, Agent, or Firm* — Sughrue Mion, PLLC

(57) ABSTRACT

A connector includes terminals, a housing containing the terminals, and a lever pivotably attached to the housing, and configured such that when pivoted, the lever brings the housing and a housing of a mating connector closer to each other to fit them, wherein the lever includes a first side plate formed with a pivot fulcrum hole serving as a center of pivot on one end side, a second side plate formed with a pivot fulcrum protruding portion serving as the center of pivot on one end side, and an operation portion connecting the other end of the first side plate and the other end of the second side plate, wherein the housing is formed with a boss configured to be fitted in the pivot fulcrum hole of the first side plate, and a recessed portion configured to allow the pivot fulcrum protruding portion of the second side plate to be fitted therein.

4 Claims, 11 Drawing Sheets

(56) References Cited

U.S. PATENT DOCUMENTS

| | | | | |
|---|---|---|---|---|
| 7,004,769 | B1 * | 2/2006 | Putnam | H01R 13/641 439/157 |
| 7,347,715 | B2 * | 3/2008 | Kobayashi | H01R 13/4538 439/376 |
| 7,445,474 | B2 * | 11/2008 | Sakatani | H01R 13/62938 439/157 |
| 7,559,780 | B2 * | 7/2009 | Mizoguchi | H01R 13/62938 439/157 |
| 7,854,619 | B2 * | 12/2010 | Takahashi | H01R 13/62938 439/157 |
| 7,922,503 | B1 * | 4/2011 | Kobayashi | H01R 13/6295 439/157 |
| 8,297,992 | B2 * | 10/2012 | Park | H01R 13/6295 439/157 |
| 8,684,773 | B2 * | 4/2014 | Kobayashi | H01R 13/62955 439/752 |
| 9,142,904 | B2 * | 9/2015 | Martin | H01R 13/4223 |
| 9,509,093 | B2 * | 11/2016 | Shimizu | H01R 13/62938 |
| 10,103,484 | B2 * | 10/2018 | Shimizu | H01R 13/62938 |
| 10,109,954 | B2 * | 10/2018 | Shimizu | H01R 13/639 |
| 10,141,681 | B2 * | 11/2018 | Shindo | H01R 13/5219 |
| 10,587,071 | B2 * | 3/2020 | Masui | H01R 13/64 |
| 10,763,610 | B2 * | 9/2020 | Bae | H01R 13/502 |
| 11,128,091 | B2 * | 9/2021 | Kobayashi | H01R 13/62938 |
| 2006/0281350 | A1 * | 12/2006 | Yamamoto | H01R 13/516 439/157 |
| 2008/0102668 | A1 * | 5/2008 | Ikeya | H01R 43/26 439/157 |
| 2010/0029147 | A1 * | 2/2010 | Shrum | H02G 15/113 439/892 |
| 2012/0129381 | A1 * | 5/2012 | Makino | H01R 13/631 439/372 |
| 2014/0273566 | A1 * | 9/2014 | Allgood | H01R 13/516 439/157 |
| 2018/0083385 | A1 * | 3/2018 | Akagi | H01R 13/62938 |

* cited by examiner

CONNECTOR WITH A LEVER

TECHNICAL FIELD

The present invention relates to a connector.

BACKGROUND

A lever-attached connector is publicly known, in which a lever is pivotably attached to a housing, and when the lever pivots, the housing and a housing of a mating connector are brought closer and mated (for example, see Patent Document 1).

FIG. 1 is view illustrating a conventional lever-attached connector 501. This connector 501 includes a housing 510 that contains multiple terminals, a spacer 504 that is attached to the housing 510 to prevent the terminals from detaching, and a lever 560.

The lever 560 is pivotably attached to a housing body 511 of the housing 510, and is pivoted from an initial position illustrated by a solid line in FIG. 11 to a mating completion position illustrated by a broken line to bring the housing body 511 and the mating connector close together and mated.

The lever 560 includes a flat cam plate 561, a flat auxiliary plate 562 arranged parallel to the cam plate 561, and a connecting portion 563 connecting the auxiliary plate 562 and the cam plate 561. The cam plate 561 and the auxiliary plate 562 are provided with a pivot fulcrum hole 565 into which a pair of bosses 514 provided on the housing body 511 are fitted. Furthermore, the cam plate 561 is provided with a cam groove 569 into which a cam protrusion of a mating connector enters.

RELATED ART

Patent Document

Patent Document 1: JP2016100185 (A)

SUMMARY OF THE INVENTION

Problem to be Solved by the Invention

The conventional connector 501 described above has a structure in which the housing 510 is provided with a boss 514, and the lever 560 is provided with a pivot fulcrum hole 565, and in order to ensure the strength of the lever 560, the lever 560 needs to be thick and have a certain size. As a result, the lever 560 overlaps the spacer 504 in the initial position (area A in FIG. 11), and when the spacer 504 is to be attached, the attachment work of the spacer 504 cannot be performed unless the lever 560 is placed in the mating completion position, and this results in poor operability. Furthermore, in order to avoid interference between the lever 560 and the spacer 504, it is necessary to move the boss 514 away from the spacer 504, in which case the connector 501 increases in size.

Therefore, it is an object of the present invention to reduce the size of the lever-equipped connector.

Solution to Problem

In order to solve the above problems and achieve the object, according to an aspect of the present invention, a connector includes a plurality of terminals, a housing containing the plurality of terminals, and a lever pivotably attached to the housing, and configured such that when the lever is pivoted, the lever brings the housing and a housing of a mating connector closer to each other to mate the housing of the connector and the housing of the mating connector, wherein the lever includes a first side plate formed with a pivot fulcrum hole serving as a center of pivot on one end side, a second side plate formed with a pivot fulcrum protruding portion serving as the center of pivot on one end side, and an operation portion connecting the other end of the first side plate and the other end of the second side plate, wherein the housing is formed with a boss configured to be fitted in the pivot fulcrum hole of the first side plate, and a recessed portion configured to allow the pivot fulcrum protruding portion of the second side plate to be fitted therein.

Advantageous Effects of the Invention

According to an aspect of the present invention, the size of the lever-equipped connector can be reduced.

DETAILED DESCRIPTION OF THE EXEMPLARY EMBODIMENT

A "connector" according to an embodiment of the present invention is hereinafter explained with reference to FIGS. 1 to 10.

Figure 1:
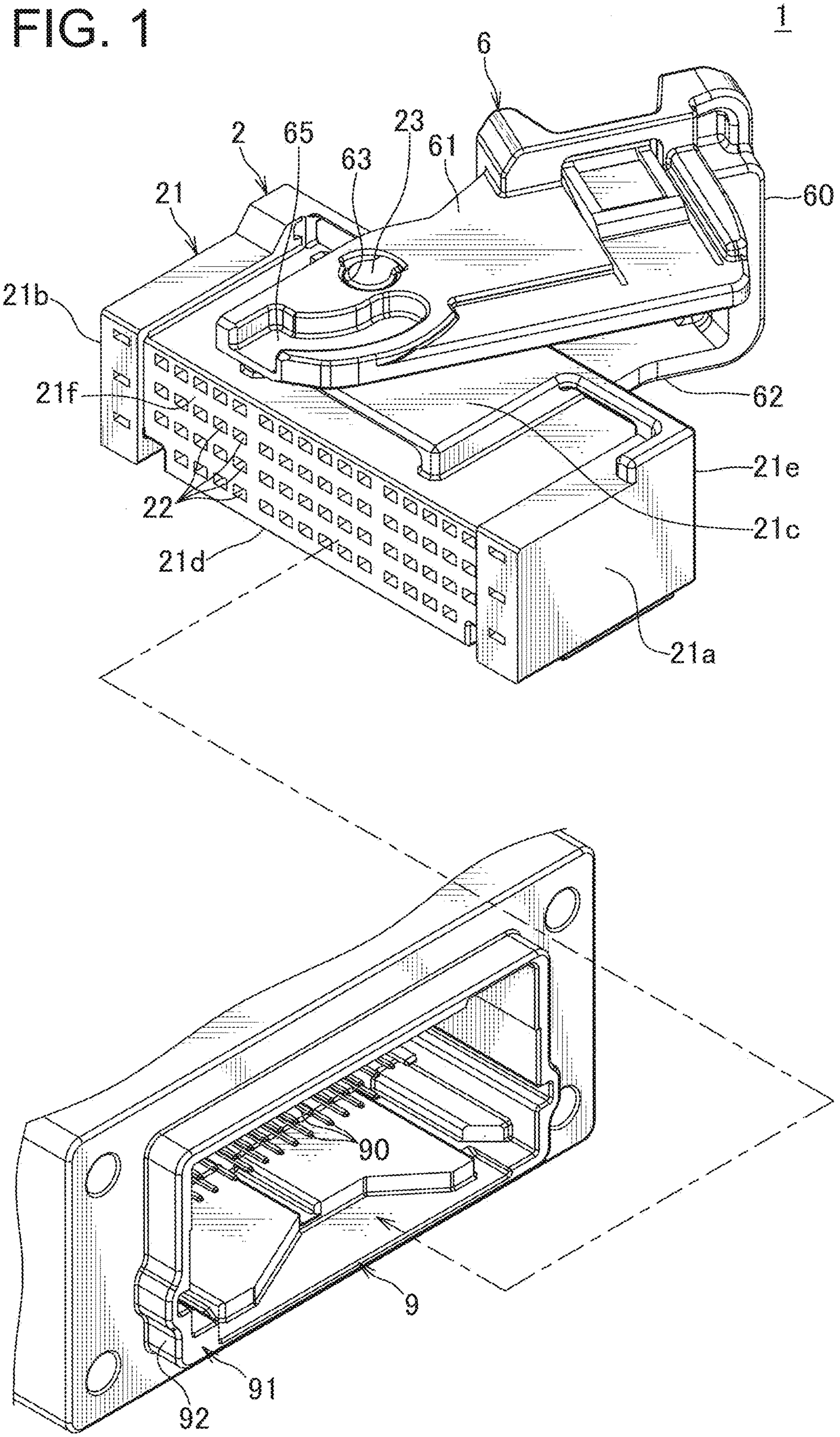
FIG. 1 is a perspective view illustrating a connector according to an embodiment of the present invention and a mating connector.
Figure 3:
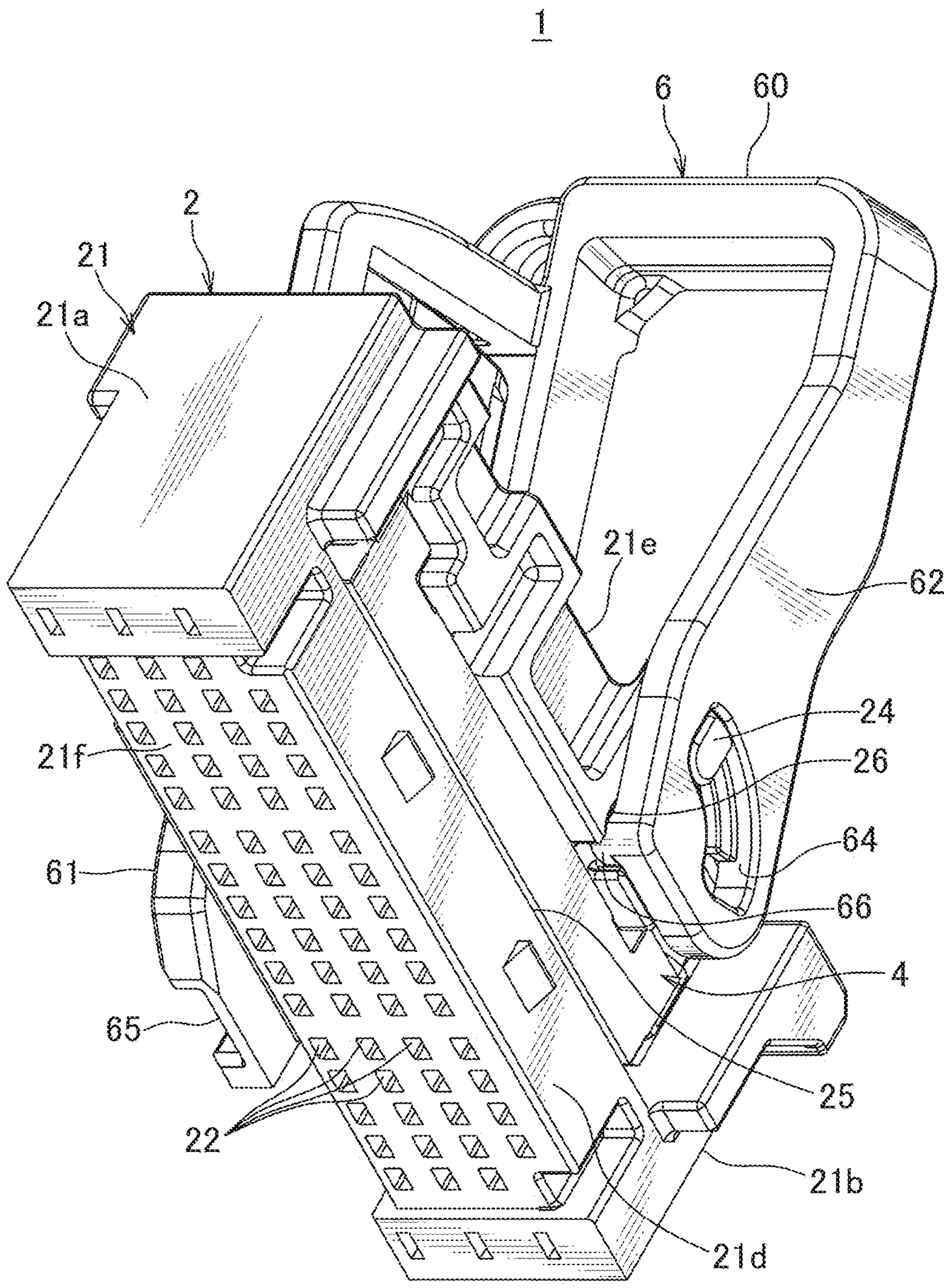
FIG. 3 is a perspective view of the connector of FIG. 1 as seen from a different angle.
Figure 4:
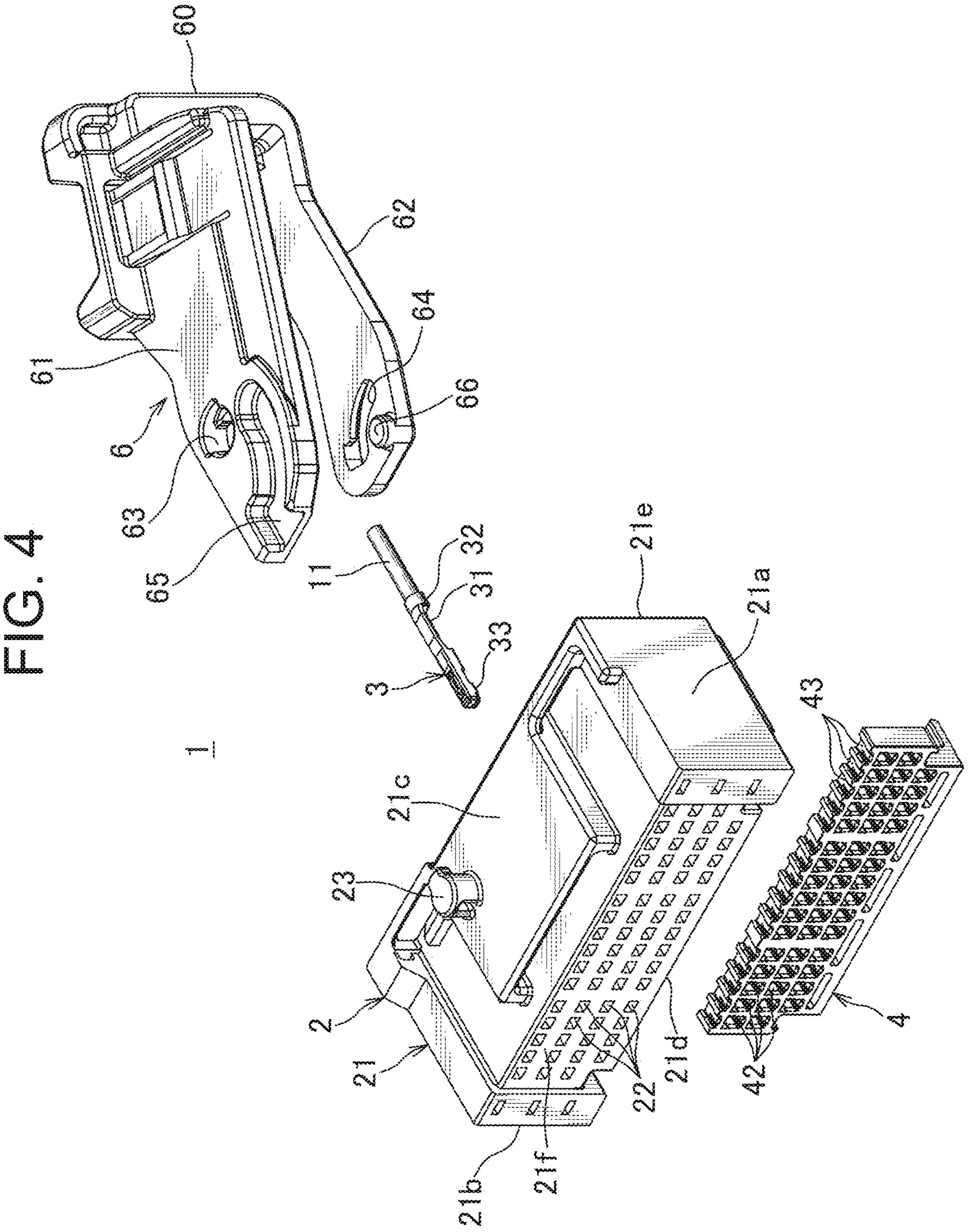
FIG. 4 is an exploded view of the connector of FIG. 1.
Figure 5:
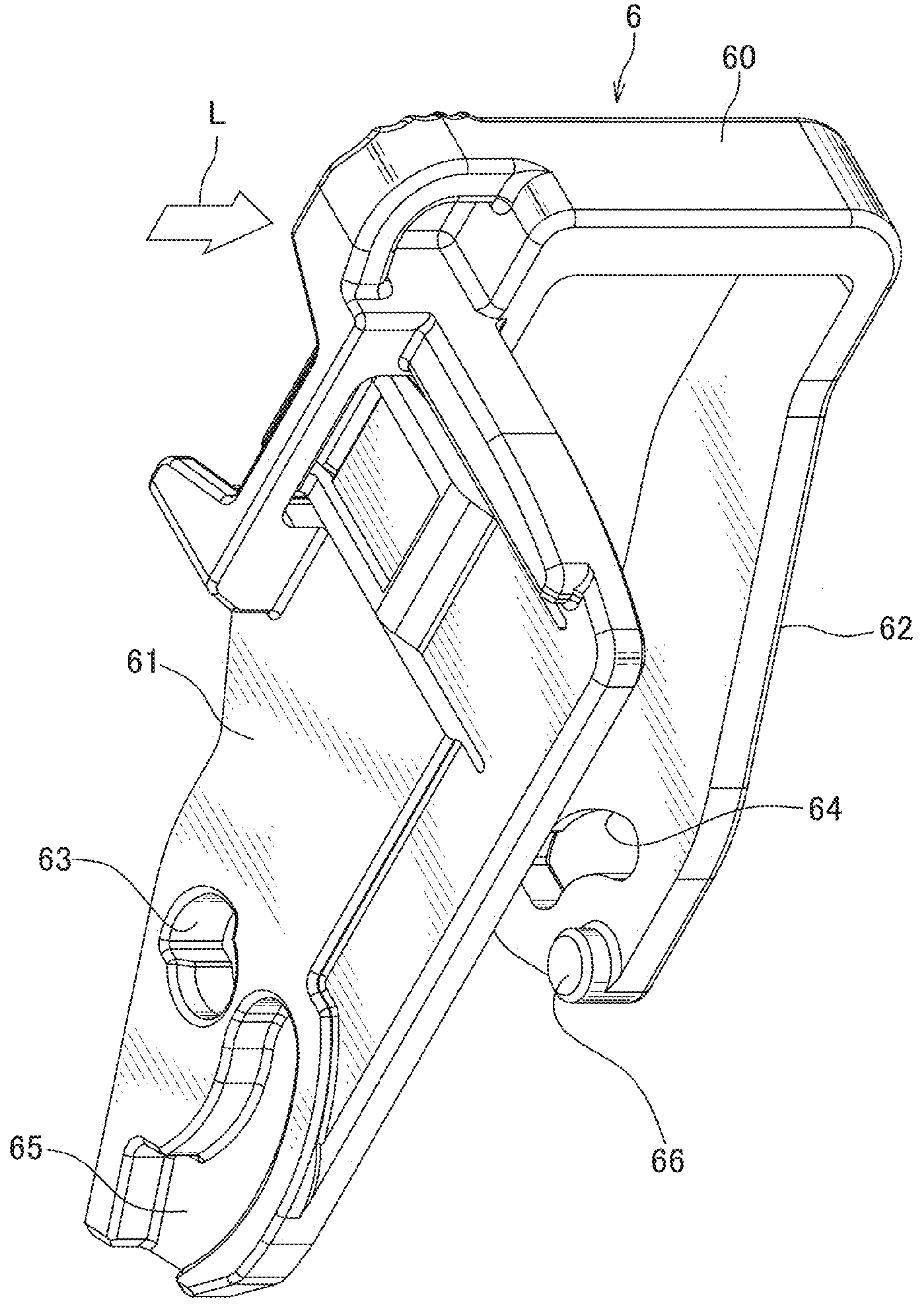
FIG. 5 is a perspective view of a lever of FIG. 4.
Figure 6:
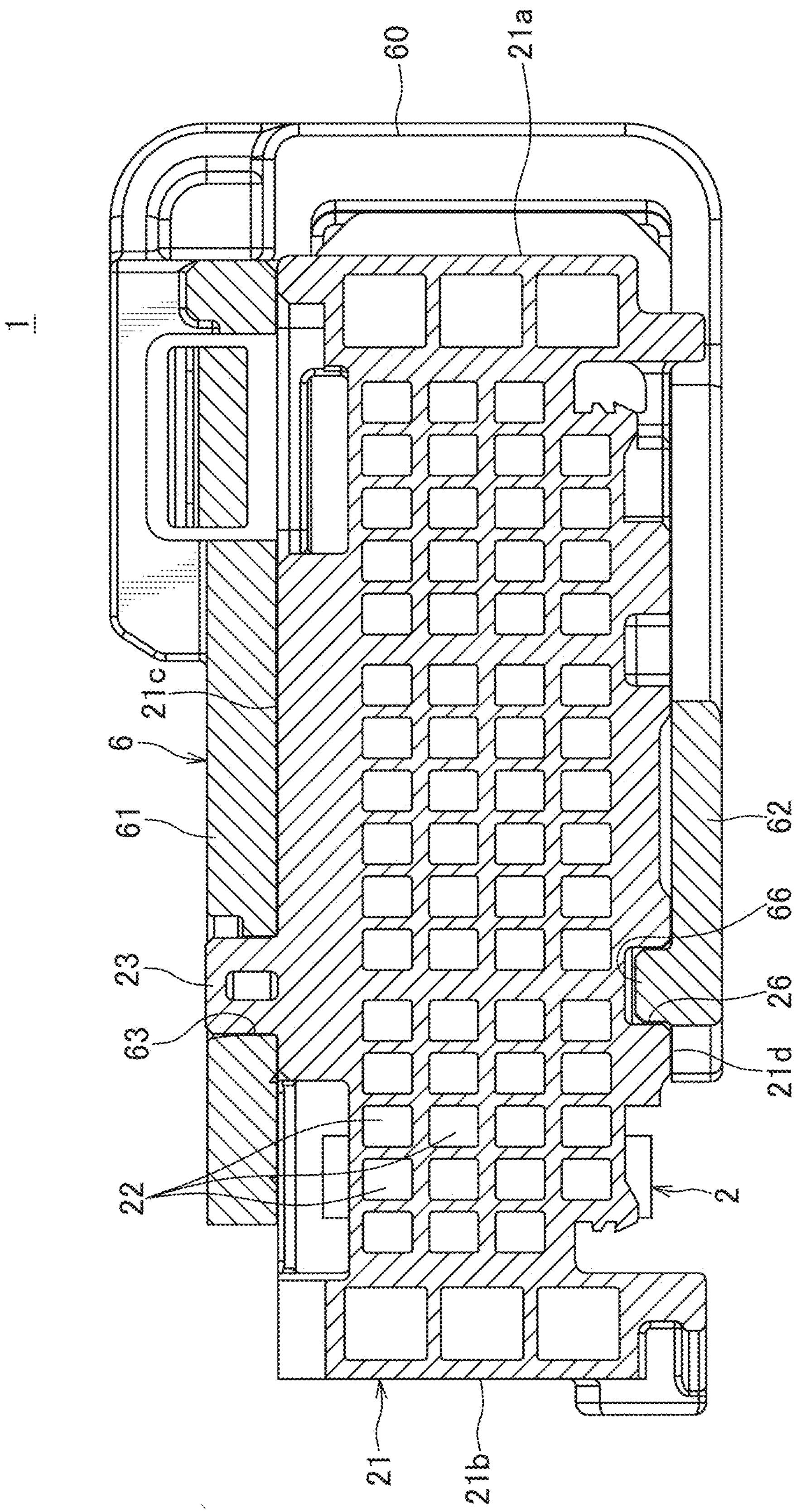
FIG. 6 is a cross-sectional view of the connector of FIG. 1.

The connector 1 illustrated in FIGS. 1, 3, and 4 is mated with a mating connector 9, and includes multiple terminals 3 (only one is illustrated in FIG. 4), a housing 2 containing the multiple terminals 3, a spacer 4 attached to the housing 2, and a lever 6.

Figure 2:
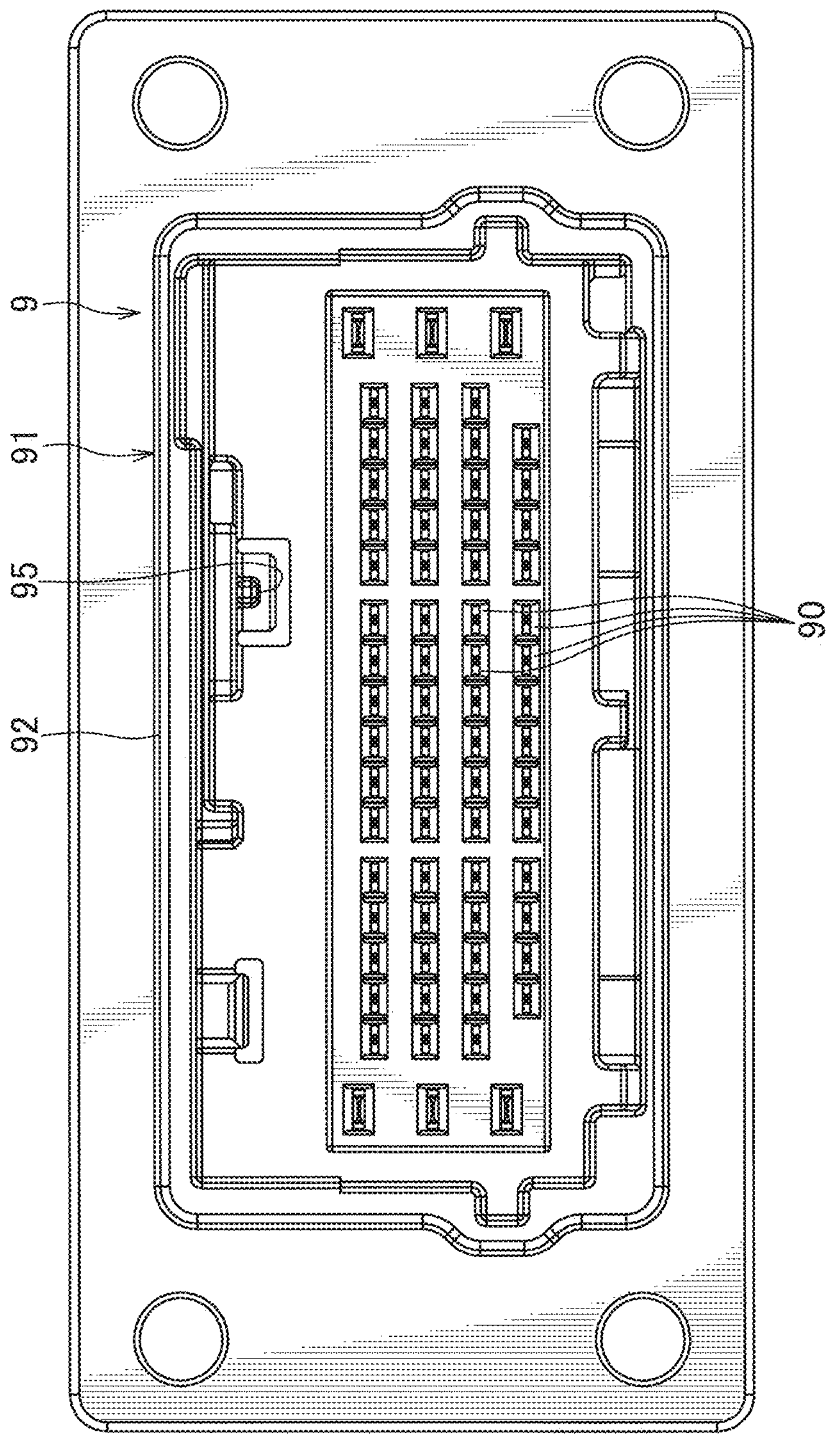
FIG. 2 is a front view of the mating connector of FIG. 1.

As illustrated in FIGS. 1 and 2, the mating connector 9 includes multiple male terminals 90 and a housing 91 containing the multiple male terminals 90. The housing 91 is made of insulating synthetic resin. The housing 91 includes a surrounding wall 92 in a rectangular cylindrical shape surrounding the multiple male terminals 90, and a cam protrusion 95 provided inside the surrounding wall 92.

The terminals 3 are connected to the ends of the electric wires 11, and each includes a core wire crimping portion 31 crimping an exposed core wire of the electric wire 11, a coating crimping portion 32 crimping the coating portion of the electric wire 11, and a connection portion 33 in a rectangular tube shape connected to a male terminal 90 of the mating connector 9. The terminals 3 as described above are generally referred to as female terminals.

The housing 2 is made of insulating synthetic resin. The housing 2 is formed into a rectangular parallelepiped shape, and includes a housing body 21 that mates with the surrounding wall 92 of the mating connector 9. The housing body 21 includes a front surface 21*f*, a back surface 21*e*, a top surface 21*c*, a bottom surface 21*d*, and a pair of side surfaces 21*a*, 21*b*. The front surface 21*f* is a surface facing the mating connector 9 in the mating direction. The back surface 21*e* is a surface opposite to the front surface 21*f*. The top surface 21*c* is a surface that includes long sides of the front surface 21*f* and the back surface 21*e*. The bottom surface 21*d* is a surface opposite to the top surface 21*c*. The bottom surface 21*d* is a surface including long sides of the front surface 21*f* and the back surface 21*e*. The side surfaces 21*a*, 21*b* are surfaces including short sides of the front surface 21*f* and the back surface 21*e*.

Note that the names the top surface 21*c* and the bottom surface 21*d* of the housing body 21 are given for convenience based on the page direction of FIG. 1, and does not necessarily correspond to the vertical direction in a situation in which the connector 1 is actually used.

A boss 23 in a cylindrical shape that fits into the pivot fulcrum hole 63 of the lever 6, which will be described later, is formed on the top surface 21*c* of the housing body 21. A recessed portion 26 into which a pivot fulcrum protruding portion 66 described later of the lever 6 fits and an auxiliary guide boss 24 that is movably positioned within an elongated hole 64 described later of the lever 6 are formed on the bottom surface 21*d* of the housing body 21.

Furthermore, the housing body 21 is formed with multiple terminal containing chambers 22, lances locking into the respective terminals 3 contained in the respective terminal containing chambers 22, and a spacer-receiving recessed portion 25 into which the spacer 4 is inserted. The terminal containing chambers 22 are open through the front surface 21*f* and the back surface 21*e*. The terminals 3 are inserted into the terminal containing chambers 22 from the back surface 21*e*. The male terminals 90 of the mating connector 9 are inserted into the terminal containing chambers 22 from the front surface 21*f* to be inserted into connection portions 33 in a square tube shape.

As illustrated in FIG. 3, the spacer-receiving recessed portion 25 is formed in a recessed manner from the bottom surface 21*d* of the housing body 21 toward the top surface 21*c*. The spacer-receiving recessed portion 25 is provided adjacent to the recessed portion 26. The spacer-receiving recessed portion 25 is arranged closer to the front surface 21*f* than the recessed portion 26 is. The connector 1 is provided so that the pivot area of a second side plate 62 described later of the lever 6 does not overlap the spacer-receiving recessed portion 25.

The spacer 4 is made of insulating synthetic resin. As illustrated in FIG. 4, the spacer 4 is provided with multiple terminal insertion holes 42 into which the terminals 3 are inserted and multiple recessed portions 43 along the terminals 3. The recessed portions 43 are arranged in the terminal containing chambers 22 in the top row of the housing body 21 (on the side of the top surface 21*c*). Then, the inner surfaces of the recessed portions 43 lock to the terminals 3 in the terminal containing chambers 22. The terminal insertion holes 42 are arranged in the terminal containing chambers 22 other than the top row. Then, the inner surfaces of the terminal insertion holes 42 are locked to the terminals 3 in the terminal containing chambers 22.

With the spacer 4 being inserted into the spacer-receiving recessed portion 25 of the housing 2 and temporarily locked, the terminals 3 are inserted into the respective terminal containing chambers 22, and the lances locks to the respective terminals 3. In this case, the terminals 3 are passed through the respective terminal insertion holes 42 of the spacer 4. Thereafter, the spacer 4 is further inserted deeper into the spacer-receiving recessed portion 25 to be fully latched to the housing 2, so that the inner surfaces of the recessed portions 43 and the inner surfaces of the terminal insertion holes 42 are locked into the respective terminals 3. In this way, with the lances of the housing 2 and the spacer 4, the connector 1 performs double locking of the terminals 3.

The lever 6 is made of insulating synthetic resin. The lever 6 is made of a stronger material than the housing 2. The lever 6 is pivotably attached to the housing 2, and by pivoting the lever 6 from the initial position to the mating completion position, the housing 2 and the housing 91 of the mating connector 9 are brought closer and mated.

The lever 6 illustrated in FIGS. 5 to 10 includes a first side plate 61 formed with a pivot fulcrum hole 63 serving as the center of pivot on one end side, a second side plate 62 formed with a pivot fulcrum protruding portion 66 serving as the center of pivot on one end side, and an operation portion 60 connecting the other end of the first side plate 61 and the other end of the second side plate 62. The pivot fulcrum hole 63 is a hole in which the boss 23 formed on the top surface 21*c* of the housing body 21 fits. The pivot fulcrum protruding portion 66 is a protruding portion in a cylindrical shape that fits into the recessed portion 26 formed in the bottom surface 21*d* of the housing body 21.

Furthermore, a cam groove 65, into which the cam protrusion 95 of the mating connector 9 enters, is formed on one end side of the first side plate 61. The elongated hole 64 to movably position the auxiliary guide boss 24 of the housing 2 is provided closer to the other end side than the pivot fulcrum protruding portion 66 of the second plate 62.

Figure 7:
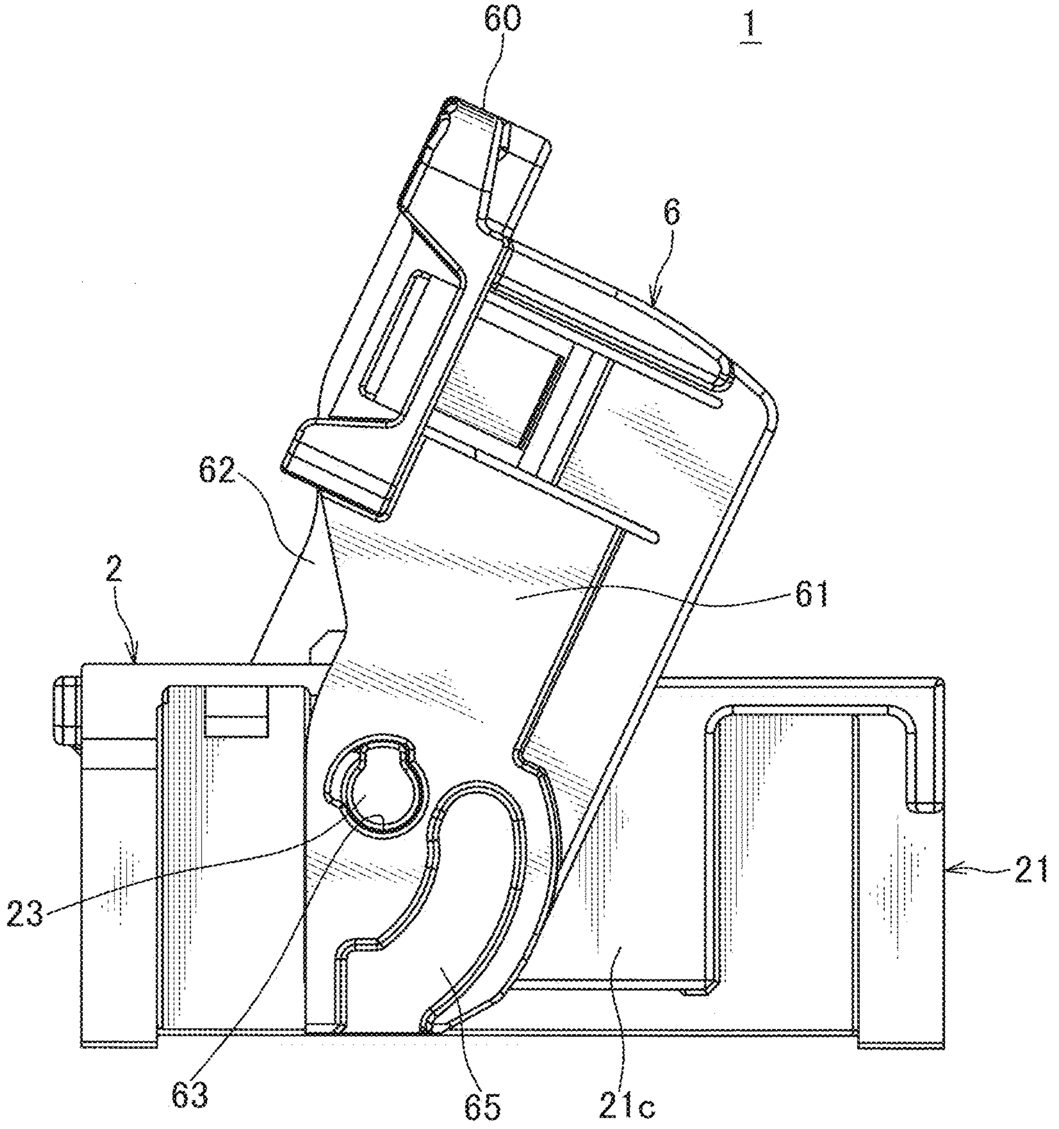
FIG. 7 is a plan view of the connector of FIG. 1.
Figure 8:
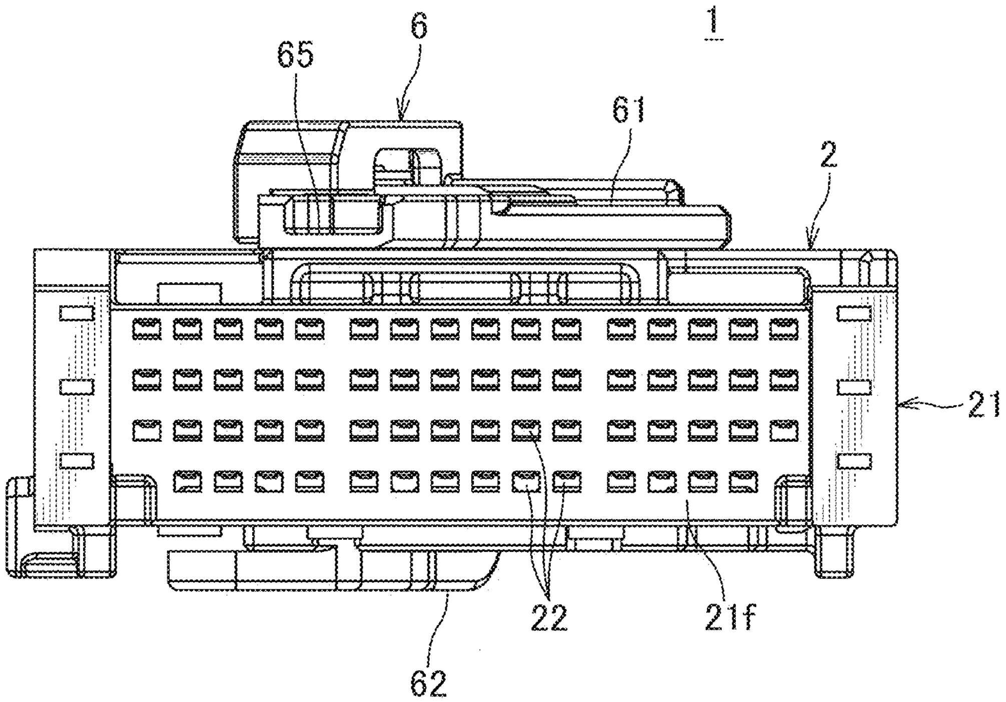
FIG. 8 is a front view of the connector of FIG. 1.
Figure 9:
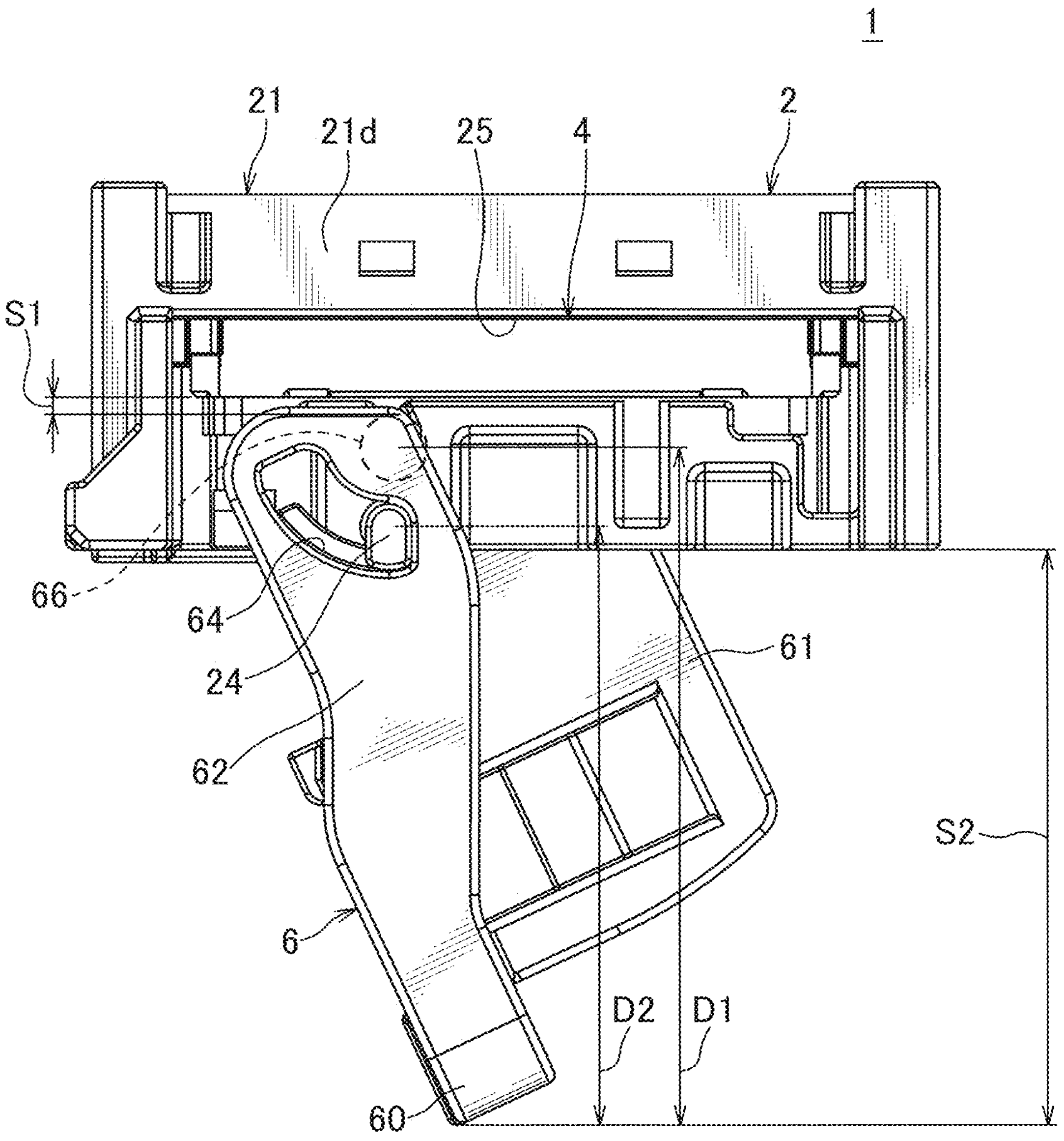
FIG. 9 is a bottom view of the connector of FIG. 1, illustrating a state in which the lever is positioned at an initial position.
Figure 10:
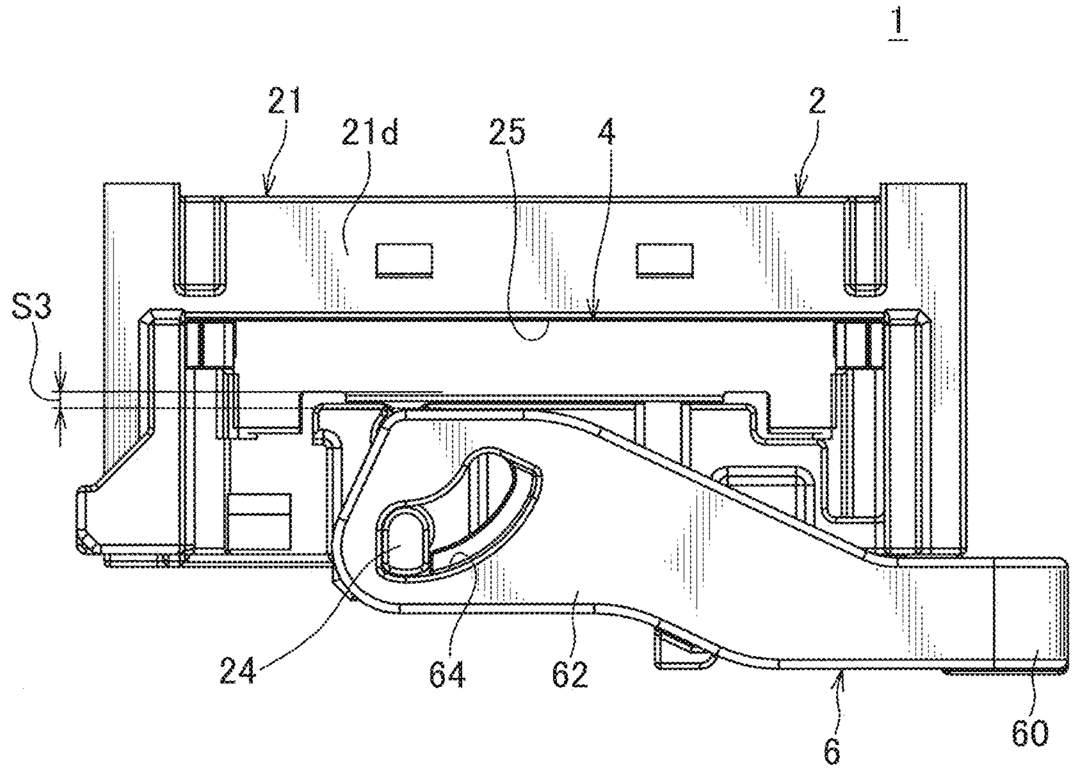
FIG. 10 is a view illustrating the lever of FIG. 9 positioned at a mating completion position.

The connector 1 is such that mating with the mating connector 9 begins with the lever 6 being held at the initial position illustrated in FIGS. 7 and 9, so that the cam protrusion 95 of the mating connector 9 smoothly enters the cam groove 65 without particularly positioning the lever 6. With the cam protrusion 95 being in the cam groove 65, the lever 6 is pivoted to the mating completion position illustrated in FIG. 10, so that the housing 2 and the housing 91 of the mating connector 9 are brought close to each other and mated.

Figure 11:
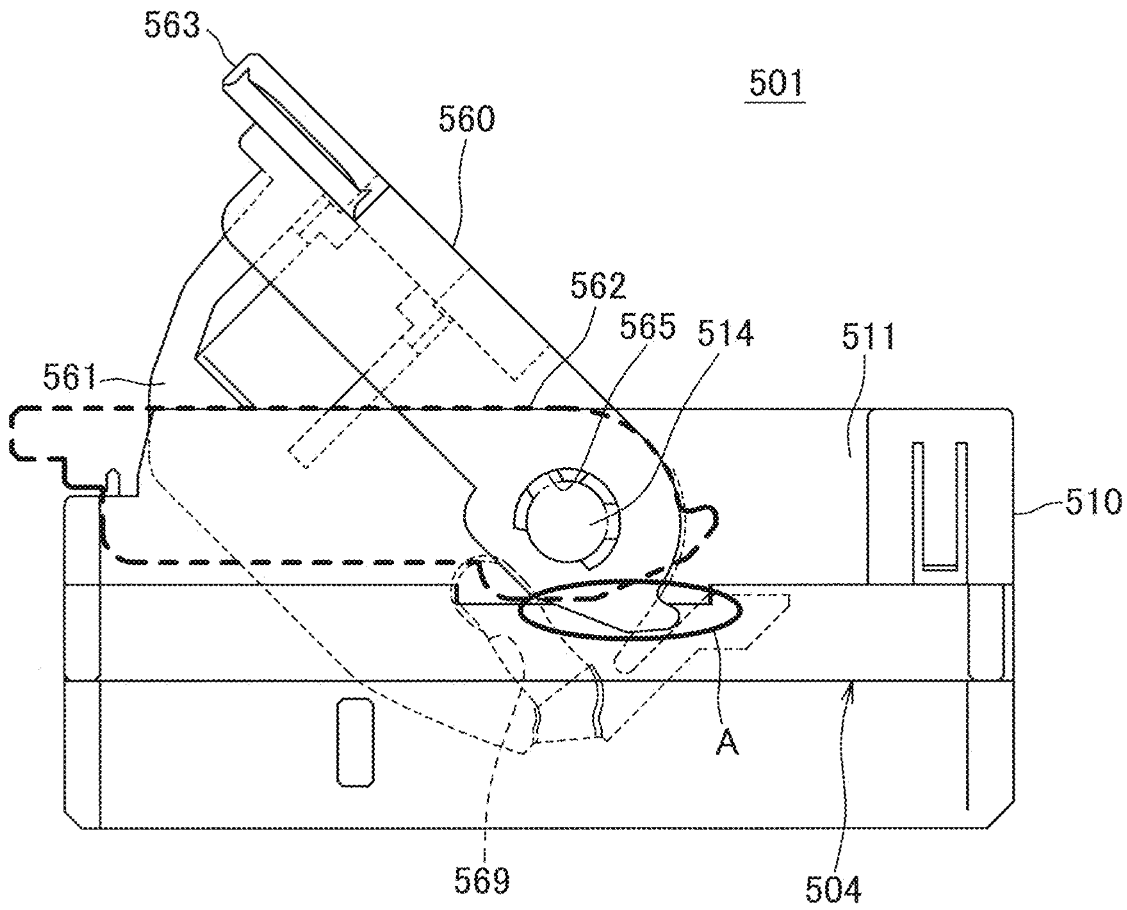
FIG. 11 is a view illustrating a conventional connector.

In the connector 1 with the above configuration, the pivot fulcrum protruding portion 66, from among the boss 23, i.e., the center of pivot of the lever 6, and the pivot fulcrum protruding portion 66, is formed on the lever 6, so that the strength of the lever 6 is higher than the conventional lever (see FIG. 11). Therefore, the wall thickness of the lever 6 can be reduced, and the size of the lever 6 can be reduced. As a result, the connector 1 can be reduced in size. Additionally, the working space for the lever 6 (S2 in FIG. 9) can be shortened, resulting in reduction of the space in which the connector 1 is installed.

The connector 1 is provided such that the pivot area of the second side plate 62 of the lever 6 does not overlap the spacer-receiving recessed portion 25. In the initial position illustrated in FIG. 9, there is a gap S1 between the lever 6 and the spacer 4, and in the mating completion position illustrated in FIG. 10, there is a gap S3 between the lever 6 and the spacer 4. This is achieved because the lever 6 has a thin and small structure, as described above. Thereby, regardless of the position where the lever 6 attached to the housing 2 is situated at, the spacer 4 can be attached to the spacer-receiving recessed portion 25, and the operability of assembling the spacer 4 can be improved.

Furthermore, the connector 1 has the auxiliary guide boss 24 described above, so that the overall size of the connector 1 is reduced while the strength of the lever 6 is maintained. That is, by providing the auxiliary guide boss 24, the lever strength against deformation is increased. In other words, when a load is applied in a direction of arrow L in FIG. 5, a moment of a distance D1 in FIG. 9 would normally act, and when the auxiliary guide boss 24 is provided, a moment of a distance D2 acts, which increases the lever strength against deformation. Furthermore, in addition to the boss 23, the auxiliary guide boss 24 is provided, so that with the two bosses, the boss strength is increased. Furthermore, the shape of the boss is different between the top surface 21*c* and the bottom surface 21*d* of the housing body 21, which prevents the lever 6 from being incorrectly assembled into the housing 2.

Note that the embodiment explained above merely illustrates a typical form of the present invention, and the present invention is not limited to this embodiment. That is, various modifications can be made without departing from the gist of the invention. It should be noted that such modifications are included within the scope of the present invention as long as they still have the structure of the present invention.

LIST OF REFERENCE SIGNS

1 connector
2 housing
3 terminal
4 spacer
6 lever
60 operation portion
61 first side plate
62 second side plate
63 pivot fulcrum hole
66 pivot fulcrum protruding portion

What is claimed is:

1. A connector comprising:

a plurality of terminals;

a housing containing the plurality of terminals; and a lever pivotably attached to the housing of the connector, and configured such that when the lever is pivoted about a center of pivot, the lever brings the housing of the connector and a housing of a mating connector closer to each other to fit the housing of the connector and the housing of the mating connector, wherein the lever includes:

a first side plate formed with a pivot fulcrum hole serving as the center of pivot on one end side;

a second side plate formed with a pivot fulcrum protruding portion serving as the center of pivot on one end side; and an operation portion connecting the other end of the first side plate and the other end of the second side plate, wherein the housing of the connector is formed with:

a boss configured to be fitted in the pivot fulcrum hole of the first side plate; and a recessed portion configured to allow the pivot fulcrum protruding portion of the second side plate to be fitted therein.

2. The connector according to claim 1, wherein an elongated hole is formed closer to the other end side than the pivot fulcrum protruding portion of the second side plate, and the housing of the connector is formed with an auxiliary guide boss configured to be movably positioned in the elongated hole.

3. The connector according to claim 1, further comprising:

a spacer attached to the housing of the connector to prevent the terminals from detaching, wherein the housing of the connector is formed with a spacer-receiving recessed portion in which the spacer fits, the recessed portion and the spacer-receiving recessed portion are provided adjacent to each other, and a pivot area of the second side plate is provided so as not to overlap the spacer-receiving recessed portion.

4. The connector according to claim 2, further comprising:

a spacer attached to the housing of the connector to prevent the terminals from detaching, wherein the housing of the connector is formed with a spacer-receiving recessed portion in which the spacer fits, the recessed portion and the spacer-receiving recessed portion are provided adjacent to each other, and a pivot area of the second side plate is provided so as not to overlap the spacer-receiving recessed portion.

* * * * *